Oct. 31, 1961  M. D. WISTI  3,006,076
BRAKE DRUM GAUGE
Filed April 27, 1960  2 Sheets-Sheet 1
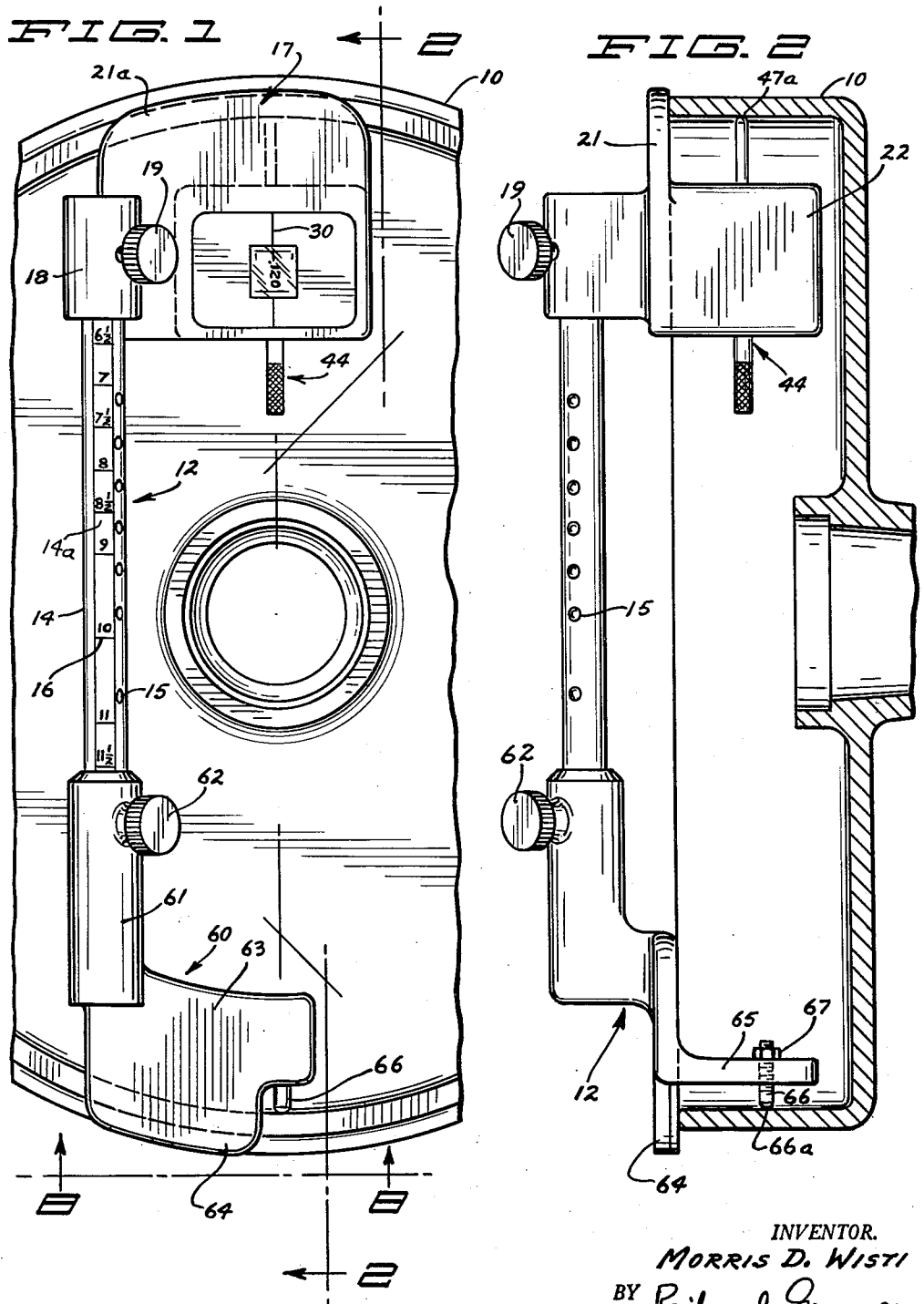
INVENTOR.
MORRIS D. WISTI
BY Reif and Gregory
ATTORNEYS Oct. 31, 1961   M. D. WISTI   3,006,076
BRAKE DRUM GAUGE
Filed April 27, 1960   2 Sheets-Sheet 2
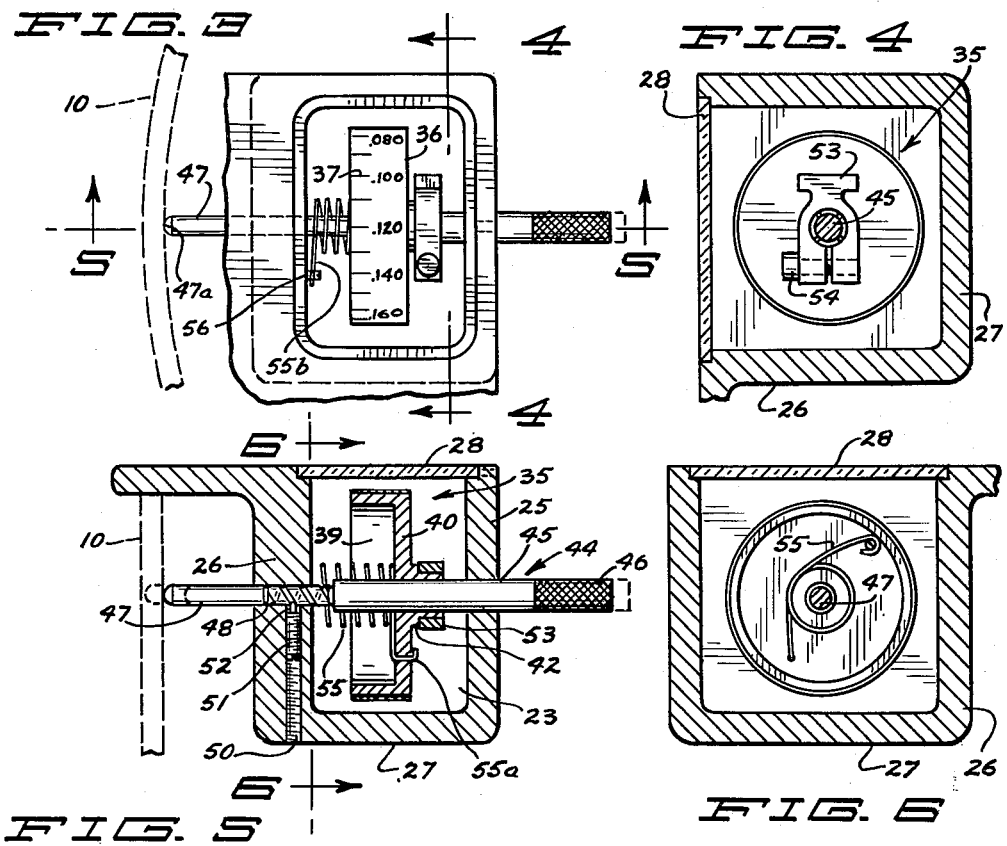
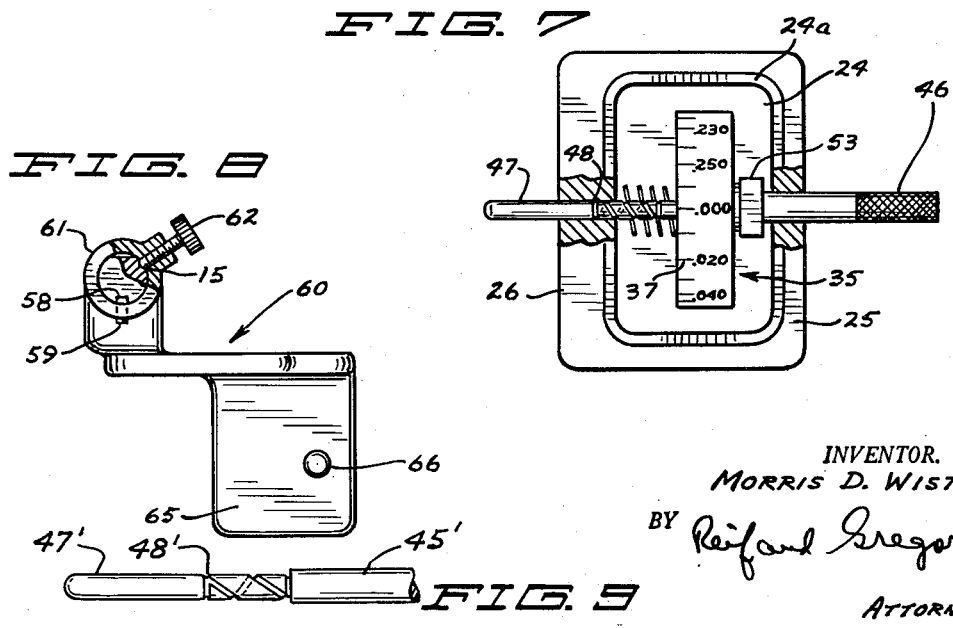
INVENTOR.
MORRIS D. WISTI
BY Reiford Gregory
ATTORNEYS United States Patent Office 3,006,076
Patented Oct. 31, 1961

3,006,076
BRAKE DRUM GAUGE
Morris D. Wisti, Minneapolis, Minn., assignor to Andrew D. Wisti, doing business as Star Machine & Tool Company, Minneapolis, Minn.
Filed Apr. 27, 1960, Ser. No. 25,030
6 Claims. (Cl. 33—178)

This invention relates to an improvement in a brake drum gauge adapted for measuring accurately the internal diameter of brake drums of the type ordinarily used in automotive vehicles.

It is an object of this invention to provide a brake drum gauge which is accurate in operation and which is made up of a few simple easily assembled parts providing a dial thereon having oversized figures shown as readings graduations thereon.

It is another object of this invention to provide a brake drum gauge adapted normally to be positioned for a maximum dimensional reading and which normally seeks the maximum diametrical dimension of a brake drum measured.

It is also an object of this invention to provide a brake drum gauge which in view of its few simple parts lends itself readily to accurate machining and for a very simple and accurate operation.

It is common for brake drum gauges to have flat dial faces having indicia thereon and having movable thereacross members such as pointers or indicators to indicate particular indicia thereon. It is a further object of applicant's device to provide a cylindrical dial having peripheral indicia thereabout with said dial being rotatably movable normally to a maximum reading in connection with a stationary reference line to indicate particular indicia on said dial.

It is also an object of applicant's device to become locked in position when in place to determine a maximum diametrical dimension and by its own action determines a maximum dimension rather than being dependent upon the skill of the operator as is the case with other like devices.

These and other objects and advantages of the invention will be fully set forth in the following description made in connection with the accompanying drawings in which like reference characters refer to similar parts throughout the several views and in which:

FIG. 1 is a top plan view of applicant's device in operating position in a fragmentary portion of a brake drum;

FIG. 2 is a view in vertical section taken on line 2—2 of FIG. 1 as indicated by the arrows;

FIG. 3 is a top plan view of a portion of applicant's device shown on an enlarged scale;

FIG. 4 is a view in vertical section taken on line 4—4 of FIG. 3 as indicated by the arrows;

FIG. 5 is a view in vertical section taken on line 5—5 of FIG. 3 as indicated by the arrows;

FIG. 6 is a view in vertical section taken on line 6—6 of FIG. 5 as indicated by the arrows;

FIG. 7 is a view somewhat similar to that shown in FIG. 3 with the dial portion thereof shown held in its minimum reading position and some portions being broken away;

FIG. 8 is a view taken on line 8—8 of FIG. 1 as indicated by the arrows with a portion thereof being broken away; and FIG. 9 is a fragmentary view of a modification of a portion of applicant's device on a somewhat enlarged scale.

Referring to the drawings, a brake drum 10 is indicated and of which a fragmentary portion is shown having disposed in operating position therein applicant's brake drum gauge 12.

Applicant's gauge 12 comprises a gauge bar 14 which may be variously formed and is here indicated as being substantially circular in transverse section and having a flat face 14a of narrow width at one side thereof. Brake drums are commonly formed to have standard sized diameters within a certain range of dimensions as from six inches through eighteen inches. A gauge bar may be provided for the full range of such dimensions or for a partial range thereof. Applicant's bar as here indicated is intended to cover a limited range of such dimensions, but within the limited range are the more commonly used dimensions. Such a bar is more easily handled than a longer one, but longer bars may be easily substituted where their use is required. Spaced along said bar 14 adjacent said flat face 14a are indentations 15 which are very accurately machined and are provided with conical recesses as shown in FIG. 8. Said indentations are indicated as being spaced at intervals representing half inches. Formed into said bar 14 in connection respectively with said indentations 15 and appearing on said flat face 14a are graduations or markings 16. Said indentations provide precise measurements of the distance indicated by their respective markings and represent standard dimensions of brake drums. At one end of said bar 14 is a gauge head 17 comprising a sleeve 18 slidable on said bar and having threadingly disposed therethrough a set screw 19 for securing said gauge head to said bar at the forward end thereof at what represents a zero position. Said screw is provided with a conical point, as indicated in the screw shown in FIG. 8, for a precisely positioned seated engagement of said gauge head to said bar.

Integral with said sleeve 18 and extending outwardly therefrom in an offset position to said bar is a plate member 21 substantially rectangular in plan but having a curved outer side portion 21a adapted to rest on the rim portion of a brake drum, as indicated in FIGS. 1 and 2. Depending from said plate member 21 is a housing 22 which may be variously formed, but is here shown to be substantially parallelepiped in form and having therein a chamber 23 also indicated as being substantially parallelepiped in form.

Said chamber 23 is shown to be fully enclosed except for its open top 24 and comprises sides 25 and 26 and a bottom 27. About said top 24 is an offset shoulder portion 24a and seated therein overlying said open top is a transparent cover plate member 28 which will be secured in a suitable manner, and if desired said cover plate may be so formed as to magnify the graduations on a dial to be hereinafter described. Extending centrally across said cover plate 28 in a direction parallel to that of said bar 14, as indicated in FIG. 1, is a reference line 30.

Disposed within said chamber 23 in parallel axial alignment with said bar 14 is a dial 35 shown as being substantially cylindrical in form having a flat peripheral portion 36 of some width inscribed with indicia 37 in the form of graduated markings. Said dial has an open-ended chamber 39 therein having an end enclosure 40 having a hub 42 extending outwardly centrally thereof. Said hub will be adapted to be compressible in any suitable manner, such as by having a longitudinally split side wall.

Disposed axially through said dial 35 and extending through said hub 42 is a cylindrical shaft-like contact pin 44. Said pin 44 is shown having a smooth barreled portion 45, a knurled hand gripping inner end portion 46, and an outer end portion 47 of reduced diameter having about an inward portion thereof, a helical groove 48 here shown extending to said portion 45. Said pin extends through suitable apertures provided in the walls 25 and 26 respectively within which said pin is journaled, and said helical groove 48 is of a length to represent the extent of said indicia 37 and is movable through said wall 26. Said indicia 37 as indicated in FIG. 7 shows a maximum reading of .250 or ¼ inch. When said pin 44 is held in retracted position to have its zero reading in alignment with the reference line 30, then the outer end of said pin 44 in connection with the outer end of pin 66 will represent the dimension 16 indicated by the setting of the sleeve 61. Thus said pin 44 in its normal extended position will add an addditional increment of ¼ inch to the dimension indicated on said bar 14 by said sleeve 61 and in operation will be retracted to a position to show the actual oversize of a dimension in excess of the indicated reading 16. Although ¼ inch is here shown as a maximum extension of said contact pin 44, said contact pin may be adapted to have a maximum extension of any desired distance.

A threaded bore 50 extends upwardly of said wall 26 into which a cylindrical key 51 is threadingly disposed having a tip portion 52 adapted to extend into or mesh with the channel of said groove 48. Thus it is seen that a rotative movement of said contact pin 45 in connection with said key 51 will cause said pin to have endwise or longitudinal movement.

A split end locking member 53, as shown in FIG. 4, and one of common usage is disposed about said hub 42 and adapted to be tightened thereabout by the screw 54 to cause said hub to be compressed and grippingly engage a barrel portion of the contact pin 44 to make said pin operationally integral with said dial 35.

Placed about said pin 44 and extending into said chamber 39 is a coiled spring 55 having one end portion 55a disposed through a small aperture in said wall 40 of said dial 35 to be secured thereto and having its other end 55b secured as by a screw 56 to said side wall 26. Said spring, dial and contact pin are so positioned normally that said contact pin is extended outwardly of said side 26 to its maximum extent and said dial will normally show a maximum reading in connection with said reference line 30. The endwise movement of said contact pin inwardly of said side 26 and the accompanying rotation of said dial 35 from a maximum graduation reading in the direction of a minimum or its zero graduation reading will tend to coil up said spring 55 and thus increase the tension of said spring. Thus the tendency of said spring 55 will be to urge said pin 44 outwardly to the maximum extent of said groove 48 and to position said dial to show a maximum reading.

At the other end of said bar 14 from said gauge head 17 is a gauge end portion 60 comprising a sleeve 61 adapted to be slidably disposed over said bar 14 and having a set screw 62 threaded therethrough identical in construction to said set screw 19 with its conically formed lower end portion being shown in FIG. 8. Said set screw 62 is adapted to engage any certain one of said indentations 15 to be seated therein for securing said gauge portion 60 to said bar 14. With further reference to FIG. 8, a keyway 58 is indicated as being machined in said bar 14 and will extend longitudinally thereof. Carried by said sleeve 61 is a key 59 adapted to ride in said keyway. Though not here illustrated, a similar key will be provided in said sleeve 18.

Integral with said sleeve 61 and extending outwardly therefrom in the direction of said plate member 21 is a plate member 63 having a curved outer side portion 64 adapted to overlie the rim portion of a brake drum. Set inwardly for some distance from said outer side portion 64 of said plate 63 is a depending wall portion 65 having disposed therethrough a stationary contact pin 66 in axial alignment with said contact pin 44 and having a portion threaded through said depending wall 65 to be locked in position by a lock nut 67. Said contact pins 44 and 66 will be respectively provided with conical outer end portions 47a and 66a for very precise engagement with the inner sides of a brake drum, as indicated in FIG. 2.

In operation and with reference to FIGS. 1 and 2, the end portion 60 of applicant's gauge will be positioned on said bar 14 and secured thereto at a distance apart from said gauge head 17 in accordance with the graduations 16 on said bar 14 to represent to the nearest standard dimension the diameter of the brake drum to be measured. The inner end of the sleeve 61 will be moved to adjacent the desired graduation 16 and the set screw 62 will be seated into the indentation 15 respectively corresponding with said graduation to accurately position said gauge end 60.

With the gauge thus set, the outer end of the contact pin 66 will be positioned to be in contact with the inner rim portion of the brake drum 10. The contact pin 44 will be retracted by manual rotation of the knurled portion 46. It has been found that, with the pitch of the groove 48 as indicated in FIG. 5, it is extremely difficult to retract said pin 44 by pressure as by pushing against its outer end. The spring 55 rotates said pin to easily normally urge said pin to a maximum extended position. Thus as here indicated, with regard to just a pushing pressure on the free end of said pin, said pin may be said to be in effect locked in extended position. Thus said pin 44 will be retracted manually to permit applicant's gauge to be positioned approximately diametrically of the brake drum 10. The operator will then release said pin 44 and it will extend outwardly to engage the adjacent inner brake drum surface.

The operator will then rock or rotate the gauge from side to side and said pin will automatically extend itself to the maximum or true diametrical dimension and having reached this dimension will prevent further rotation by being locked, as indicated above, from movement to a smaller dimensional extent. Thus applicant's gauge by means of its own substantially automatic operation determines the diametrical dimension and holds it for an accurate reading. The dial reading will thus be set and will not waver or fluctuate. Thus the accuracy of the gauge itself and its normal operation rather than the skill of the operator determines the diametrical dimension of the brake drum.

Applicant's dial 35 is provided with quite large graduations thereon and the cover plate 28 for convenience may be made of such material as to magnify said graduations so that they may be easily and accurately read. Applicant's device is formed of but few simple parts which lend themselves to precise machining for very accurate and dependable performance.

With reference to FIG. 9, a modification of the pin 44 is shown in which the groove 48' is set to have a much steeper pitch than is indicated by the groove 48. In having a steeper pitch, said pin may be retracted by pressure against its outer end which makes unnecessary a manual retraction of said pin as is necessary of pin 44 by rotation of the knurled portion 46. The operation will be the same as above described except that the pin having groove 48' will first engage the inner surface of a brake drum and will be pressed to permit the positioning of said pin 66. Then by rotation back and forth, said pin will seek out and indicate the maximum dimension or accurate diametrical reading of said brake drum.

Thus it is seen that I have provided a brake drum gauge simple of operation and which provides an accurate reading as a result of the normal operation of the device rather than as a direct and sole result of the skill of the operator.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A brake drum gauge having in combination, a bar, a housing offset from said bar slidably mounted at one end thereof, a chamber in said housing, a dial having graduations being rotatably disposed within said chamber about an axis parallel to the axis of said bar, a contact pin disposed axially through said dial, secured thereto and journaled in said housing, said contact pin in connection with associated means being movable endwise outwardly of said housing when rotated, means in said housing associated with said dial for normally rotating said dial and said pin to extend said pin its maximum extent outwardly of said housing to indicate a maximum reading of the graduations on said dial in relation to an associated reference line whereby when said pin is reversely moved endwise in being placed in operating position said dial is reversely rotated in the direction of its minimum reading of graduations, and a second contact pin carried at the other end of said bar being in axial alignment with said first contact pin.

2. A brake drum gauge having in combination, a bar, a housing offset from said bar slidably mounted at one end thereof, a chamber in said housing, a cylindrical dial having peripheral graduations thereabout disposed in said chamber and having its axis parallel to the axis of said bar, a reference line carried by said housing in connection with said graduations, a contact pin axially disposed through said dial to be integral therewith and to be journaled in said housing and being movable to extend outwardly thereof, means in said housing for normally rotatably urging said dial to a maximum reading position of said graduations with relation to said reference line, means carried in said housing in association with said contact pin for moving said pin endwise when said pin is rotated whereby normally said pin is extended to a maximum position outwardly of said housing, and a second contact pin carried at the other end of said bar in axial alignment with said first contact pin, said contact pins respectively having remote contact points adapted to engage a brake drum at diametrical points whereby said first contact pin is moved inwardly in the direction of said second contact pin to rotate said dial in a direction towards a minimum reading thereon in measuring the diameter of said brake drum.

3. A brake drum gauge having in combination, a bar, a housing offset from said bar slidably mounted at one end thereof, a chamber in said housing, a dial in said chamber, graduations about said dial, a reference line in said housing in connection with said graduations, a contact pin disposed axially through said dial and journaled in said housing, means in said housing for moving said contact pin endwise when said contact pin is rotated, resilient means in said housing for normally rotating said dial and said contact pin to move said contact pin to a maximum extent outwardly of said housing and said contact pin being movable in a reverse direction against said resilient means to measure the extension of said contact pin outwardly of said housing as indicated by said graduations in connection with said reference line and a second contact pin carried at the other end of said bar.

4. A brake drum gauge having in combination, a bar, a housing offset from said bar slidably mounted thereon at one end thereof and adapted to be secured thereto at certain points thereon, a chamber in said housing substantially parallelepiped in form, a cylindrical dial disposed in said chamber having its axis parallel to the axis of said bar and having peripheral graduations thereabout, a reference member carried by said housing for association with said graduations, a contact pin integral with said dial axially disposed therethrough and journaled in said housing having its end portions extending therethrough, a spring in said chamber connected to said dial to normally urge said dial to rotate in the direction of the maximum reading of said graduations thereon, said contact pin having a helical groove therein, a pin in said housing to be seated in said groove to move said contact pin endwise when said contact pin is rotated, a second contact pin mounted at the other end of said bar in axial alignment with said first contact pin whereby when said pins are positioned in a brake drum in contact therewith at opposed points therein, as said gauge is moved from side to side said first contact pin will move outwardly to the maximum extent of said brake drum and rotate said dial in a direction towards the maximum reading of graduations thereon.

5. The structure set forth in claim 4, said helical groove being of a certain degree of pitch to prevent rotation of said first mentioned pin by pressure against the free end thereof whereby with reference to said pressure, said pin is locked in extended position.

6. The structure set forth in claim 4, said helical groove being of a certain degree of pitch to be responsive to endwise pressure on said pin for rotation of said pin and retraction of the same.

References Cited in the file of this patent

UNITED STATES PATENTS

| 2,303,858 | Ostberg | Dec. 1, 1942 |
| 2,648,134 | Billeter | Aug. 11, 1953 |